United States Patent

Yu

[19]

[11] Patent Number: 5,995,238
[45] Date of Patent: Nov. 30, 1999

[54] FACSIMILE SYSTEM WITH PAPER SAVING FUNCTION FOR PRINTING TRANSMIT TERMINAL IDENTIFICATION TO OVERLAP AN UPPER MARGIN OF PRINT PAPER

[75] Inventor: Sang-Yun Yu, Seoul, Rep. of Korea

[73] Assignee: SamSung Electronics Co., Ltd., Suwon, Rep. of Korea

[21] Appl. No.: 08/853,865

[22] Filed: May 9, 1997

[30] Foreign Application Priority Data

May 10, 1996 [KR] Rep. of Korea ................... 96-15488
Mar. 13, 1997 [KR] Rep. of Korea ..................... 97-8404

[51] Int. Cl.$^6$ .................................................. H04N 1/00
[52] U.S. Cl. ........................................ 358/404; 358/449
[58] Field of Search .................... 358/404, 440, 358/449, 451, 441, 444; 395/114; 707/518, 520, 521, 525, 517

[56] References Cited

U.S. PATENT DOCUMENTS

| | | | |
|---|---|---|---|
| 5,021,889 | 6/1991 | Yamamoto | 358/440 |
| 5,084,770 | 1/1992 | Nakayama | 358/403 |
| 5,343,306 | 8/1994 | Oshita | 358/441 |
| 5,392,138 | 2/1995 | Ootsuka et al. | 358/498 |
| 5,409,317 | 4/1995 | Ueno et al. | 400/61 |
| 5,428,459 | 6/1995 | Asai | 358/449 |
| 5,455,686 | 10/1995 | Nagano et al. | 358/404 |
| 5,467,203 | 11/1995 | Kawata | 358/451 |
| 5,493,421 | 2/1996 | Uetama et al. | 358/468 |
| 5,604,846 | 2/1997 | Kadota | 395/114 |
| 5,798,843 | 8/1998 | Yamamoto et al. | 358/404 |
| 5,816,165 | 10/1998 | Huston | 101/490 |
| 5,873,110 | 2/1999 | Toyosawa et al. | 707/518 |

*Primary Examiner*—Yon J. Couso
*Attorney, Agent, or Firm*—Robert E. Bushnell, Esq.

[57] ABSTRACT

A method for printing in a frugal way to save ordinary print paper from unnecessary loss in a facsimile machine specifies the effective print length for a sheet of the print paper, which includes the steps of: receiving one sheet data, determining whether the amount of the received one sheet data exceeds the effective print length, determining whether the effective print length is greater than the sum of a predetermined length of the TTI region and the length of the substantial content of the received one sheet data if the amount of the received one sheet data exceeds the effective print length, and printing the received one sheet data with the TTI overlapping the upper margin of the effective print length if the effective print length is greater than or equal to the sum of the predetermined length of the TTI region and the length of the substantial content of the received one sheet data.

10 Claims, 5 Drawing Sheets

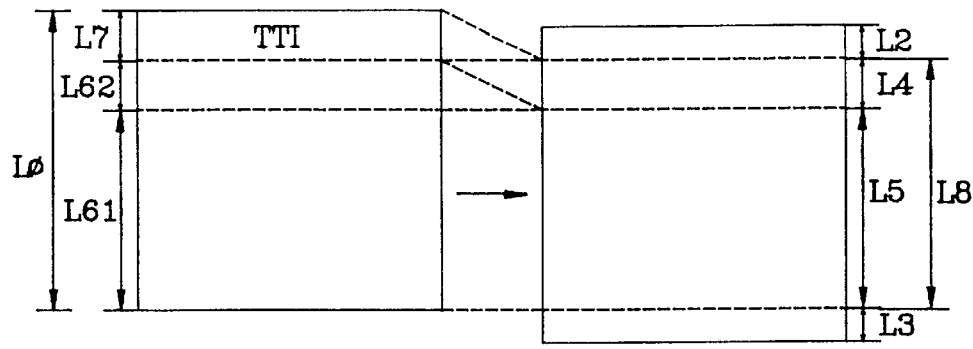
FIG. 6A    FIG. 6B
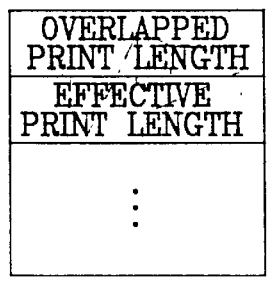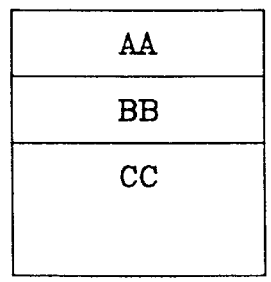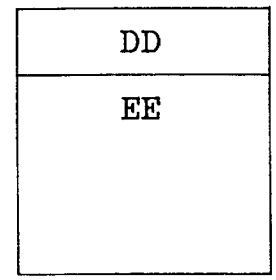
FIG. 7A  FIG. 7B  FIG. 7C

FACSIMILE SYSTEM WITH PAPER SAVING FUNCTION FOR PRINTING TRANSMIT TERMINAL IDENTIFICATION TO OVERLAP AN UPPER MARGIN OF PRINT PAPER

CLAIM FOR PRIORITY

This application makes reference to, incorporates the same herein, and claims all benefits accruing under 35 U.S.C. § 119 from an application for *DEVICE FOR SAVING PRINTING PAPER UPON PRINTING IN A FACSIMILE MACHINE AND METHOD THEREFOR* earlier filed in the Korean Industrial Property Office on May 10, 1996 and March 13, 1997, and there duly assigned Serial Nos. 15488/1966 and 8404/1997, respectively.

BACKGROUND OF THE INVENTION

1. Technical Field

The present invention relates to a facsimile system having a paper saving function, and more particularly relates to a method for saving print paper in a facsimile system by overlapping a transmit terminal identification (TTI) with real document data.

2. Related Art

A conventional facsimile system has a capability of sending information such as transmit terminal identification (TTI) for identifying the terminal from which the facsimile transmission is made, to other communication terminals according to a pre-transmission procedure. By performing the pre-transmission procedure, TTI information is added at the head or upper end portion of the page to be transmitted after conversion to an image formation. In some facsimile systems such as disclosed in U.S. Pat. No. 5,021,889 for *Facsimile Apparatus* issued to Yamamoto, the TTI information is made only to restricted communication terminals which are registered in a memory in order to prevent undesirable transmission of the TTI information to unwanted communication terminals.

Generally, in such facsimile systems, if the length of the content of a received document exceeds the content-allowable print length of each individual sheet of print paper not including the upper and lower margins and the TTI region, the remaining content of the received document that may not be included in the same sheet would be lost or printed on a next sheet of the print paper. If the remaining content of the received document is printed on the next sheet without completely filling up the page, it is cost prohibitive notwithstanding the user inconvenience in the maintenance of the document. Of course, if the facsimile systems are those that use a print paper in a paper roll, there is no danger to lose a part of the content of the transmitted document, but the cost prohibition remains.

Recent efforts in the art to conserve the print paper in the facsimile system are disclosed, for example, in U.S. Pat. No. 5,428,459 for *Facsimile Apparatus For Minimizing Printing Of White Data At End Of Page* issued to Asai, U.S. Pat. No. 5,455,686 for *Facsimile Apparatus With Paper Saving Function* issued to Nagano et al., and U.S. Pat. No. 5,493,421 for *Facsimile Apparatus* issued to Uetama et al. For example, Asai '459 discloses a facsimile system for minimizing printing white data at end of the page. Nagano et al. '686 discloses a facsimile system for saving consumption of print paper by the contraction-printing in the longitudinal direction of the print paper. Uetama et al. '421 seeks to print the original while omitting the unrequited data portion such as the margin of the original in order to conserve print paper.

While the conventional facsimile system has several paper saving functions, I have noted that farther improvement to conserve print paper can be still contemplated.

SUMMARY OF THE INVENTION

Accordingly, it is therefore an object of the present invention to provide a facsimile system for printing in a frugal way to save print paper from unnecessary loss without degrading print quality.

It is also an object to provide a facsimile system having a paper saving function for printing transmit terminal identification (TTI) information to overlap an upper margin of a sheet of print paper.

These and other objects of the present invention can be achieved by a facsimile system for printing in a frugal way to save print paper from unnecessary loss which comprises a memory having a first memory region for storing an overlapped print length and a second memory region for storing an effective print length, the overlapped print length making the space of a sheet of the print paper for printing a transmit terminal identification (TTI) overlap the upper margin of the sheet, a first print buffer having a first region for storing said TTI and a second region for storing the substantial content of a received document, a second printer buffer having a third region corresponding to the overlapped print length and a fourth region corresponding to the remainder obtained by subtracting the overlapped print length from the effective print length, and a controller for sequentially generating addresses to respectively access the first and second regions from the start points up to the overlapped print length. Each pixel data of the accessed image data of the first region is logically added to the corresponding pixel data of the accessed image data of the second region. The additions are sequentially stored into the third region of the second print buffer. The controller further generates an additional address so as to access the remainder obtained by subtracting the overlapped print length from the second region. Thus, the substantial content of the received document is stored into the fourth region of the second print buffer.

According to another embodiment of the present invention, a method for printing in a frugal way to save ordinary print paper from unnecessary loss in a facsimile machine which specifies the effective print length for a sheet of the print paper, comprises the steps of receiving one sheet data, determining whether the amount of the received one sheet data exceeds the effective print length, determining whether the effective print length is greater than the sum of a predetermined length of the TTI region and the length of the substantial content of the received one sheet data if the amount of the received one sheet data exceeds the effective print length, and printing the received one sheet data with the TTI overlapping the upper margin of the effective print length if the effective print length is greater than or equal to the sum of the predetermined length of the TTI region and the length of the substantial content of the received one sheet data.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 6A and 6B are schematic illustrations of a transmitted document and the received print according to the principles of the present invention;

FIGS. 7A, 7B and 7C are schematic diagrams of storage patterns of memories constructed according to the principles of the present invention.

DETAILED DESCRIPTION OF THE PREFERRED EMBODIMENT

Figure 1:
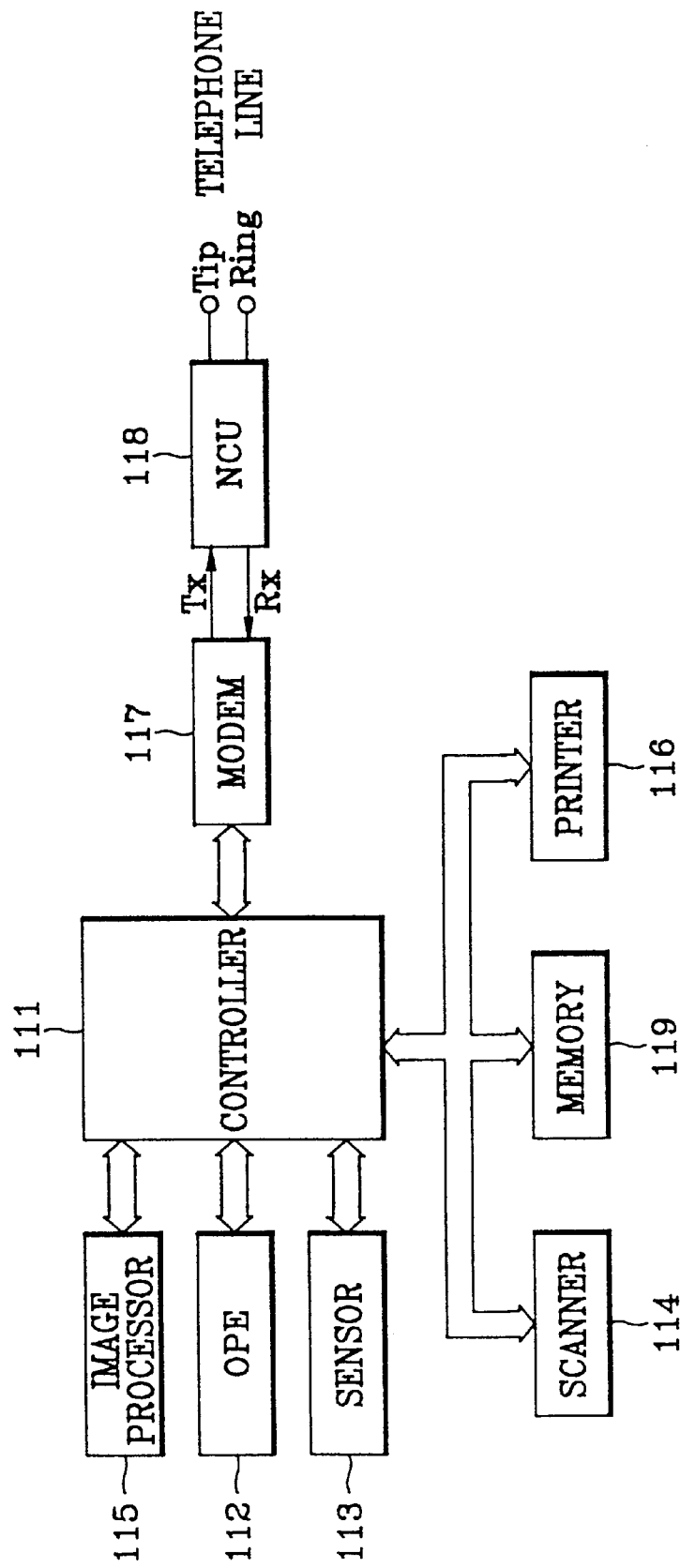
FIG. 1 is a block diagram of a facsimile system constructed according to the principles of the al present invention.

Referring now to the drawings and particularly to FIG. 1, which illustrates a facsimile system constructed according to the principles of the present invention. The facsimile system includes a controller 111 for controlling operations of the facsimile system, an operational panel 112, a sensor 113, a scanner 114, an image processor 115, a printer 116, a modem 117, a network control unit NCU 118, a memory 119, and a telephone having a handset (not shown).

The controller 111 is connected to a memory 119 which contains a program memory such as a ROM (not shown) which stores programs for controlling the general operation of the facsimile is system in either one of a transmission mode, a reception mode and a copy mode, and a data memory such as a RAM (not shown) which temporarily stores various information. A paper saving program for performing a print paper saving function of a facsimile system as contemplated by the present invention is stored in the program memory of memory 119. Memory unit including a first printer buffer and a second printer buffer for storing print paper information as contemplated by the present invention is stored in the data memory of memory 119. The controller 111 includes therein an address generation circuit (not shown) for generating addresses to access the memory 119 and a logic circuit (not shown) for controlling the paper saving program.

The operational panel (OPE) 112 comprises a key input unit and a display unit. The key input unit of the operational panel 112 generates key data to the controller 111, when pressed by a user for designating each mode of operation and the operation of the designated mode. Further, when the facsimile system is operating in a designated mode of operation such as a transmission mode, a reception mode and a copy mode, the display unit of the OPE 112 displays data indicative of the designated mode of operation of the facsimile system while performing each mode. The sensor 113 senses whether a document is input into the facsimile system, or whether a copy paper is stored, and generates a sensed signal to the controller 111. The scanner 114 includes a charge coupled device (CCD) for scanning an image of the input document and then generating image data corresponding to the scanned image. The image processor 115 processes the image data output from the scanner 114 and from the modem 117 in order to generate processed image data for either transmission via a telephone line or copy during the copy mode under control of the controller 111, and processes the image signal received from the telephone line during the reception mode. For example, the image processor 115 distinguishes the image data received from the scanner 114 into background and text or generates an image data of intermediate contrast so as to make the received image almost the same as the original image.

The printer 116 prints the image data received from the image processor 115 on a printable medium such as individual sheets of print paper during the reception mode and the copy mode under the control of the controller 111. The modem 117 modulates the image data output from the image processor 115 into a modulated image signal for transmission, and duplicates the image signal inputs to the image processor 115 during the reception mode under the control of the controller 111. The network control unit (NCU) 118 is connected with the telephone line to form transmission and reception paths for the modem 117 under the control of the controller 111. The paper saving program contained in the controller 111 to execute the inventive method is described later with reference to FIG. 8, with memories including storage regions as shown in FIG. 7.

Figures 2A, 2B:
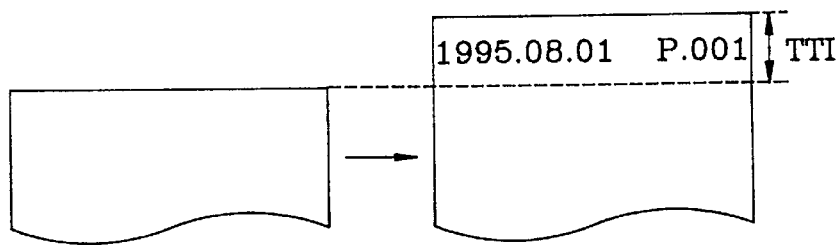
FIG. 2A is a schematic illustration of a typical transmitted document.
FIG. 2B is a schematic illustration of a print paper of the transmitted document having an upper end portion printed with transmit terminal identification region information.

Refer now to FIGS. 2A and 2B, which illustrate a document from a transmitting facsimile system and a print out of the transmitted document at a receiving transmitting system having the TTI information printed at the upper end portion of a print paper. In typical facsimile systems using standard sheets of print paper, if the length of the content of a received document exceeds the content-allowable print length of each individual sheet of print paper not including the upper and lower margins and the TTI region, the remaining content of the received document that may not be included in the same sheet would be lost or printed on a next sheet of the print paper. If the remaining content of the received document is printed on the next sheet without completely filling up the page, it is cost prohibitive notwithstanding the user inconvenience in the maintenance of the document. Of course, if the facsimile systems are those that use a print paper in a paper roll, there, is no danger to lose a part of the content of the transmitted document, but the cost prohibition remains.

Figures 3A, 3B:
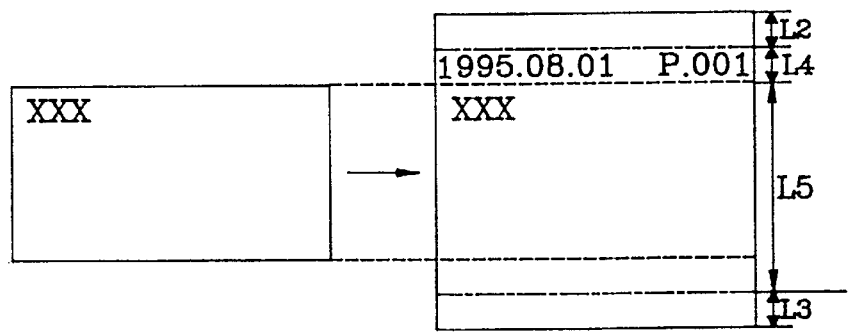
FIGS. 3A and 3B are schematic illustrations of substantial content of a transmitted document fully included in the effective print length of a sheet of print paper.

FIGS. 3A and 3B illustrate the substantial content of a transmitted document which is fully included in an effective print length of a print paper obtained by subtracting the upper and lower margins from the whole length of the print paper. As shown in FIG. 3A, "XXX" indicates the starting position of the content of a transmitted document. Upon receipt of the transmitted document, a sheet of standard size print paper which is printed with the full content of the transmitted document in the effective print length L5 having the upper and lower margins L2 and L3 and the TTI region L4.

Figures 4A, 4B:
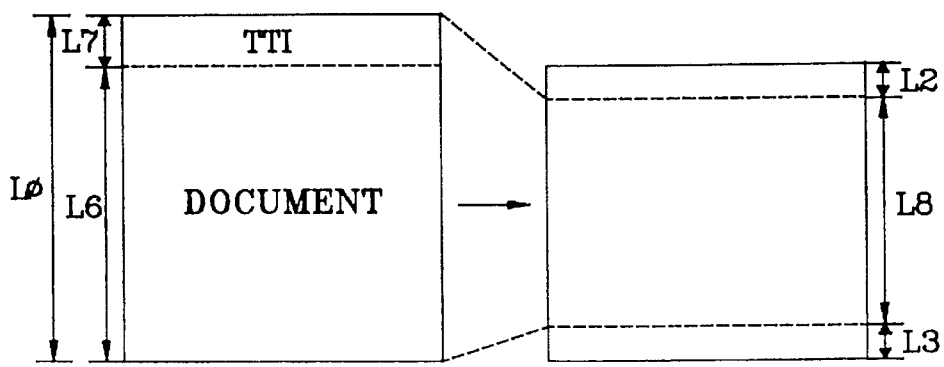
FIGS. 4A and 4B are schematic illustrations of a transmitted document having the content length of L6 and the transmit terminal identification region length of L7 compared to the received print having the effective print length L8 and the upper and lower margins L2 and L3.

FIGS. 4A and 4B illustrate a transmitted document having the content length of L6 and the TTI length of L7 (FIG. 4A)

compared to the received print having the effective print length L8 and the upper and lower margins L2 and L3 (FIG. 4B). The whole length Lϕ of the transmitted document including the substantial content L6 and TTI information L7 is reduced to print in the effective print length L8. The TTI information is part of the transmitted document for convenience's sake as shown in FIG. 4A.

Figure 5:
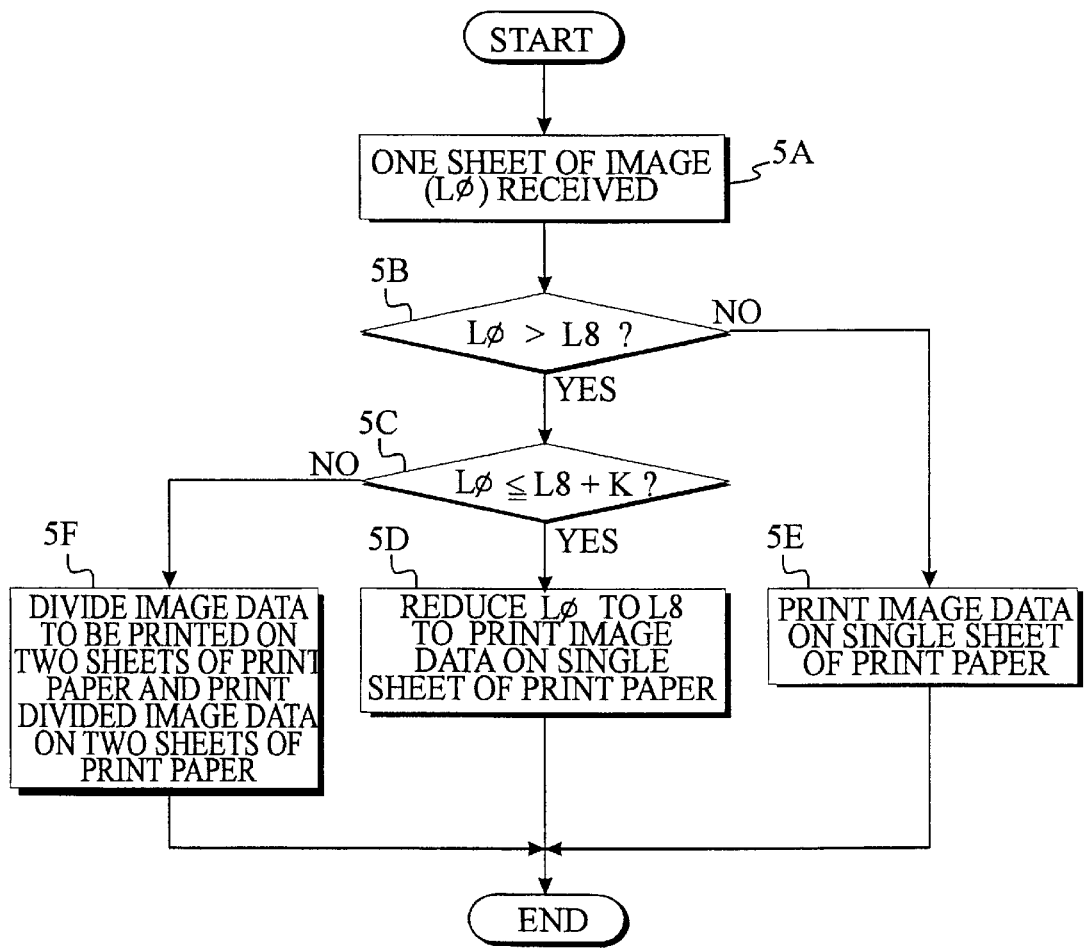
FIG. 5 is a flow chart for controlling a normal or reduced printing of a received document in an exemplary facsimile system.

FIG. 5 illustrates a program for controlling the normal or reduced print of the received document in a typical facsimile system. First, upon receipt of one sheet of image data Lϕ as shown in FIG. 4A at step 5A, the facsimile system determines whether the length of one sheet of image data received is greater than the effective print length L8 at step 5B. If Lϕ is not greater then L8, the entire content of the transmitted document is printed on one sheet of print paper at step SE. If the one sheet of image data Lϕ is determined to be greater than the sum of the effective print length L8 and an optional value "K" at step 5C, the received one sheet data is controlled to print the entire content on two sheets of the print paper at step 5F. Otherwise, the received one sheet data Lϕ is reduced to the effective print length L8 to print the entire content on one sheet of print paper at step 5D. However, such a reduced print may degrade the picture quality.

Turning now to FIGS. 6A and 613, which illustrate a transmitted document and a received print according to the principles of the present invention. If the whole length L61+L62 of the content of a received document is greater than the effective print length L5 of a single sheet of print paper, the received document is printed with the TTI information overlapping the upper margin L62. FIG. 6A illustrates an original document, and FIG. 613 illustrates a single sheet of print paper where the upper margin of the original document is overlapped by the TTI information in the upper marginal region L4. Of course, the TTI information is illustrated as a part of the transmitted document for convenience's sake as shown in FIG. 4A.

FIG. 7A illustrates a data memory of memory 119 for storing the overlapped print length, the effective print length, etc. predetermined by means of the OPE 112. FIG. 7B illustrates a first printer buffer including a first second and third regions AA, BB and CC for respectively storing the L7, L61 and L62 as shown in FIG. 6A. FIG. 7C illustrates a second printer buffer including the fourth and fifth regions CC and EE for respectively storing the L4 and L5 as shown in FIG. 6B. Each pixel data of the first region AA is logically added to with the corresponding pixel data of the second region BB through OR gate, so that the added data are stored in the fourth region DD. The data of the third region CC are transferred correspondingly to the fifth region EE.

Figure 8:
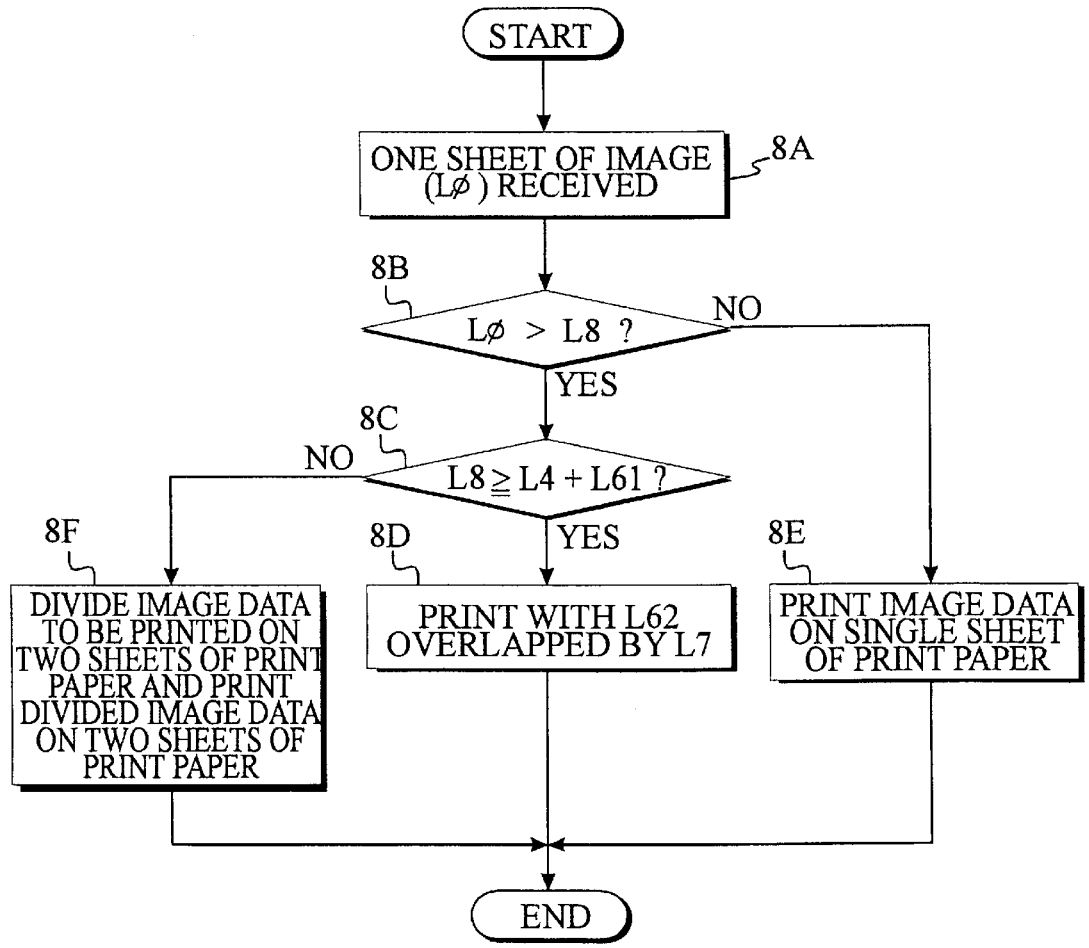
FIG. 8 is a flow chart for controlling a method for printing in a frugal way to save ordinary print paper from unnecessary loss in a facsimile system according to the principles of the present invention.

Now, the inventive method for printing in a frugal way to save ordinary print paper from unnecessary loss in a facsimile system constructed according to the principles of the present invention is described with reference to FIGS. 6 and 8, as follows.

First, one sheet of image data Lϕ as shown in FIG. 6a is received from a remote communication system at step 8A. Upon receipt of one sheet of image data Lϕ, the controller 11 1 determines whether the image data Lϕ is greater than the effective print length L8 at step 8B. If the image data Lϕ is not greater than the effective print length L8, the controller 111 controls the printer 116 to print the received image on a single sheet of print paper at step 8E. If the image data Lϕ is greater than the effective print length L8, however, the controller 111 next determines whether the effective print length L8 is greater than or equal to the sum of the predetermined length L4 of TTI region and the length L61 of the substantial content of the received document at step 8C. If the effective print length L8 is smaller than the sum of the predetermined length L4 of TTI region and the length L61, the controller 111 divides the received image data to be printed on two successive sheets of print paper and prints the divided image data on two successive sheets of print paper at step 8F. Otherwise, the received image data is printed on a single sheet of print paper with the upper margin L62 overlapped by the TTI L7 at step 8D. In this case, the length L7 is predetermined substantially the same as the length L62.

When a sheet of print paper is printed this way, there may hardly occur a part of the meaningful content of the received document coexisting with the TTI because the original document will customarily have a sufficient upper margin. Of course, the inventive overlapping technique may combined with the conventional reducing technique to achieve a more effective saving of the print paper.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A facsimile system for saving print paper upon printing, comprising:

a memory having a first memory region for storing an overlapped print length and a second memory region for storing an effective print length, said overlapped print length marking the space of a sheet of said print paper for printing a transmit terminal identification information to overlap an upper margin of said sheet of print paper;

a first print buffer having a first region for storing said transmit terminal identification information and a second region for storing the substantial content of a received document;

a second printer buffer having a third region corresponding to said overlapped print length and a fourth region corresponding to a remainder obtained by subtracting said overlapped print length from said effective print length; and a controller for sequentially generating addresses to respectively access said first and second regions from a start point to said overlapped print length, each pixel data of the accessed image data of said first region being logically added to the corresponding pixel data of the accessed image data of said second region, the additions being sequentially stored into said third region of said second print buffer, and said controller further generating additional addresses so as to access the remainder obtained by subtracting said overlapped print length from said second region, thereby storing said substantial content of the received document into said fourth region of said second print buffer.

2. The facsimile system of claim 1, further comprised of print paper corresponding to standard size paper.

3. The facsimile system of claim 1, further including a key input unit for inputting said overlapped print length.

4. A facsimile system for saving print paper upon printing, comprising:

a memory having a first memory region for storing an overlapped print length and a second memory region for storing an effective print length, said overlapped print length marking the space of a sheet of print paper for printing transmit terminal identification information to overlap an upper margin of said sheet;

a first print buffer having a first region for storing said transmit terminal identification information and a second region for storing the substantial content of a received document;

a second printer buffer having a third region corresponding to said overlapped print length and a fourth region corresponding to a remainder obtained by subtracting said overlapped print length from said effective print length;

an address generation circuit for generating an overlap address to access the commonly overlapped print length of said first and second regions and a normal address to access said effective print length of said second region; and a logic circuit for logically adding each pixel data of the accessed image data of said first region to the corresponding pixel data of the accessed image data of said second region, the additions being sequentially stored into said third region of said second print buffer, and the data read from said second region in response to said normal address being stored into said fourth region of said second print buffer.

5. The facsimile system of claim 4, further including a key input unit for inputting said overlapped print length.

6. A method for saving print paper upon printing in a facsimile system which specifies the effective print length for a sheet of said print paper, comprising the steps of:

receiving one sheet of image data;

determining whether the amount of a received image data exceeds said effective print length;

determining whether said effective print length is greater than the sum of a predetermined length of a transmit terminal identification region and the length of the substantial content of said received image data, when the amount of said received image data exceeds said effective print length; and printing said received image data with said transmit terminal identification region overlapping an upper margin of said effective print length, when said effective print length is not less than the sum of said predetermined length of said transmit terminal identification region and the length of the substantial content of said received image data.

7. The method of claim 6, further printing said received image data on a sheet of said print paper without said overlapping, when the length of said received image data does not exceed said effective print length.

8. The method of claim 6, further printing said received image data on two successive sheets of said print paper, when said effective print length is smaller than the sum of said predetermined length of said transmit terminal identification region and the length of the substantial content of said received image data.

9. The method of claim 7, further printing said received image data on two successive sheets of said print paper, when said effective print length is smaller than the sum of said predetermined length of said transmit terminal identification region and the length of the substantial content of said received image data.

10. The method of claim 6, further setting the length of said overlapping before receiving said one sheet of image data.

* * * * *